Feb. 18, 1969 SHINTARO OSHIMA ET AL 3,428,955

WOVEN WIRE MEMORY MATRIX

Filed Sept. 17, 1963 Sheet 1 of 9

INVENTORS
SHINTARO OSHIMA,
TETSUSABURO KAMIBAYASHI

BY Robert E. Burns
Attorney

INVENTORS
SHINTARO OSHIMA,
TETSUSABURO KAMIBAYASHI

INVENTORS
SHINTARO OSHIMA,
TETSUSABURO KAMIBAYASHI

BY Robert E. Burns
Attorney

INVENTORS
SHINTARO OSHIMA,
TETSUSABURO KAMIBAYASHI

BY Robert E. Burns
Attorney

INVENTORS
SHINTARO OSHIMA,
TETSUSABURO KAMIBAYASHI

BY Robert E. Burns
Attorney

INVENTORS
SHINTARO OSHIMA,
TETSUSABURO KAMIBAYASHI

BY Robert E Burns
Attorney

INVENTORS
SHINTARO OSHIMA,
TETSUSABURO KAMIBAYASHI

BY Robert E. Burns
Attorney

INVENTORS
SHINTARO OSHIMA,
TETSUSABURO KAMIBAYASHI

BY Robert E. Burns
Attorney

INVENTORS
SHINTARO OSHIMA,
TETSUSABURO KAMIBAYASHI
BY Robert E. Burns
Attorney

United States Patent Office 3,428,955

Patented Feb. 18, 1969

3,428,955

WOVEN WIRE MEMORY MATRIX

Shintaro Oshima, Musashino-shi, and Tetsusaburo Kamibayashi, Kitaadachi-gun, Saitama-ken, Japan, assignors to Kokusai Denshin Denwa Kabushiki Kaisha (also known as Kokusai Denshin Denwa Co., Ltd.), Chiyoda-ku, Tokyo-to, Japan, a joint-stock company of Japan Filed Sept. 17, 1963, Ser. No. 309,470

Claims priority, application Japan, Oct. 15, 1962, 37/44,727; Jan. 28, 1963, 38/3,078; May 6, 1963, 38/23,314; May 13, 1963, 38/23,925; June 22, 1963, 38/31,234; Aug. 22, 1963, 38/44,163, 38/44,164, 38/44,165; Sept. 4, 1963, 38/46,509

U.S. Cl. 340—174 21 Claims

Int. Cl. G11c *11/10*

This invention relates to a memory matrix, and more particularly, it relates to a woven wire memory matrix using conductive wires with magnetic hysteresis characteristic.

Although there have been proposed and in use various kinds of memory apparatuses as an important component member of electronic computers, most of these apparatuses comprise magnetic memory elements. An example of such apparatuses is a ferrite magnetic core matrix composed of a large number of ring ferrite magnetic cores arranged in matrix arrangement with column conductors and row conductors provided therethrough. Another example is a memory apparatus using magnetic thin film which comprises a substratum coated with spots of ferromagnetic thin film in matrix form and column and row conductors which are so arranged as to intersect to one other at each of said spots. In the case of the former example, the effect of eddy current is negligible due to the characteristic of the ferrite, and moreover, thanks to the recent research and development efforts, it became possible to obtain apparatus of small size with short access time, although there is a limitation to the improvement of its operating speed because of the fact that the speed of magnetization reversal of the ferrite is comparatively slow. Furthermore, in its manufacture, ring-shaped ferrite magnetic cores which are to be allocated for the storage of one bit of information are to be composed by securing each of said cores, one by one, with respective column conductors and respective row conductors. Hence, it is not suitable for mass-production, thus making it expensive and increasing the power consumption thereof. Also, there is a limitation in its miniaturization, and its Curie point is comparatively low.

On the other hand, the latter memory apparatus wherein spots of magnetic thin film are used has faster operating speed because of a high speed of magnetization reversal speed caused by a characteristic of ferromagnetic metallic thin film as well as other excellent features such as very small power consumption and wider range of using temperature. However, it is difficult to make uniform products in continuous and mass-production system on account of its manufacturing process wherein a vacuum evaporation method is used mostly. It is especially difficult to realize always the uniform establishment of the easy axis which is an essential requirement. For this reason, conventional memory apparatuses of (ferromagnetic thin film type) are expensive and limited to comparatively small capacity, and have not yet been made in any forms suitable for mass-production.

The object of this invention is to provide a novel and inexpensive magnetic thin film matrix memory apparatus which is free from such defects as mentioned above, can sufficiently utilize excellent characteristic peculiar to the ferromagnetic thin film, and moreover, possesses small dimension, large capacity, ease of its manufacture and suitability for mass-production and can reproduce a uniform property in its production.

Said object and other objects of this invention have been attained by a memory apparatus which comprises, a set of row conductive wires juxtaposed to one another and a set of column conductive wires arranged substantially orthogonal to and insulatively against said row conductive wires, and memory means composed of magnetic substance for storing at least one bit of information in accordance with the polarity of the residual magnetism thereof, characterized in that at least surface part of each of said row conductive wires is composed of a ferromagnetic substance having a substantially hysteresis characteristic, and the set of said row conductive wires and the set of said column conductive wires are associated, in a woven state, with one another, whereby a bit of information is stored in the ferromagnetic substance disposed around at least one selected intersection point between said two sets of conductive wires, when selection of the stored information is achieved by energizing a selected row conductive wire and a selected column conductive wire.

The novel features of this invention are set forth with particularity in the appended claims. This invention, however, both as to its construction and operation together with further advantages thereof, may best be understood by reference to the following description, taken in connection with the accompanying drawings, in which:

FIGS. 1(A), (B) and (C) are perspective views showing the construction of a memory wire to be used as a memory element of a wire memory matrix embodying the features of this invention;

FIGS. 2(A), (B) and (C) are schematic views illustrating the operating principle of a wire memory matrix embodying the features of this invention;

FIGS. 3, 5, and 6 are wave form diagrams illustrating the operating principle of a wire memory matrix embodying the features of this invention;

FIG. 4 is a characteristic curve of magnetic hysteresis illustrating the operating principle of a wire memory matrix embodying the features of this invention;

FIGS. 7(A) and (B) are, respectively, a perspective view and a sectional view of a wire memory matrix embodying the feature of this invention;

FIG. 8(A) and FIG. 9 are perspective views of wire memory matrixes embodying the feature of this invention;

FIGS. 8(B) and (C) are fragmental, perspective views illustrating conductive wires employed as column conductive wire of memory matrix shown in FIGS. 7, 8, and 9;

FIGS. 10(A), (B), (C) and (D) are sectional views for illustrating combination of rows and column in wire memory matrixes embodying the feature of this invention;

FIGS. 11(A) and (B) are perspective views of other arrangements of column conductive wires in the wire memory matrix embodying the feature of this invention;

Figure 13:
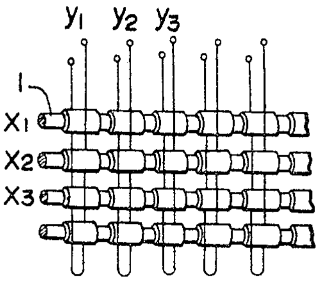
FIG. 13 is a perspective view of an example of a wire memory matrix wherein each memory element is insulated.
Figure 14A:
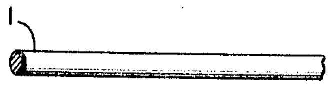
Figure 14B:
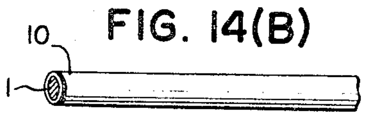
Figure 15A:
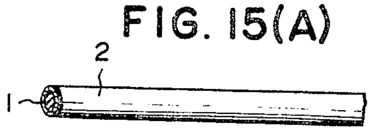
Figure 16A:
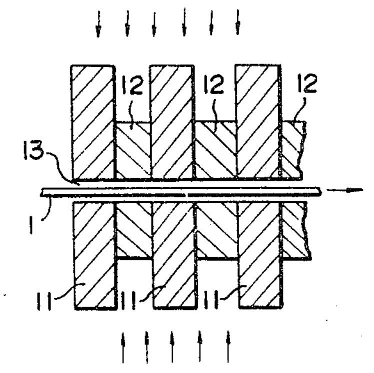
Figure 18:
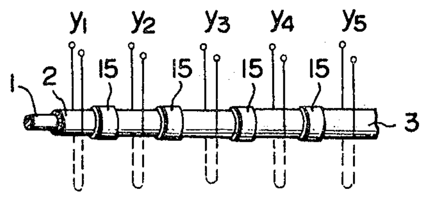
Figure 19:
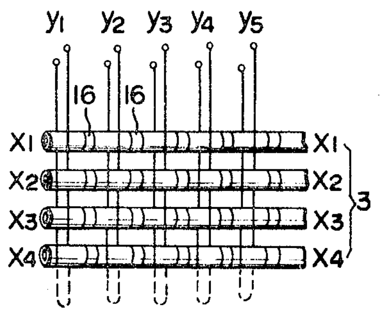
Figure 17:
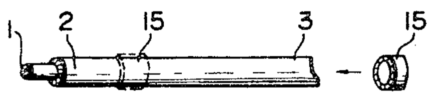
Figure 23:
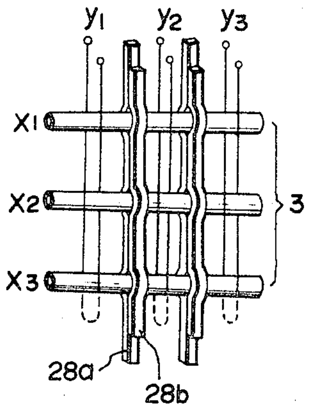
Figure 24A:
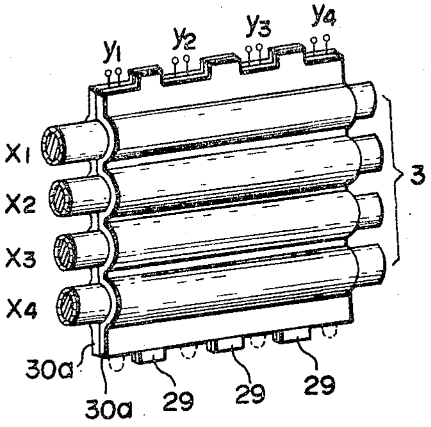
Figure 24B:
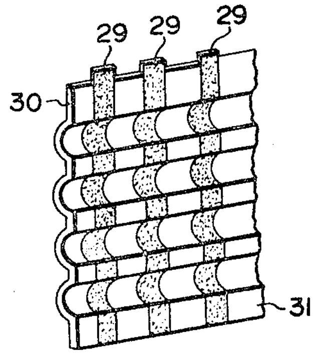
Figure 25:
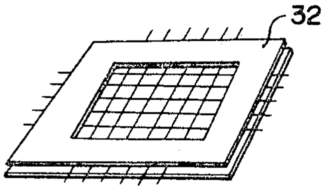

FIGS. 14(A), (B), (C) and (D), FIGS. 15(A), (B) and (C) are perspective views for describing construction of the memory matrix shown in FIG. 13;

FIGS. 16(A), (B) and (C) are sectional views for describing the method of manufacturing the memory wire of FIG. 13;

FIGS. 17 and 18 are perspective views for describing short ring means in the memory matrix of this invention;

FIG. 19 is a perspective view showing the memory matrix of this invention provided with the short ring means;

FIGS. 20(A), 20(B), 21(A), 21(B), 22(A), 22(B), 23, 24(A), and 24(B) are perspective views and/or sectional views showing the short ring means of a memory matrix of this invention; and FIG. 25 is a perspective view showing one example of holding means for the wire memory matrix of this invention.

First, a memory wire to be used as the memory means of a magnetic memory matrix embodying the features of this invention will be explained.

Figures 1A, 1B:
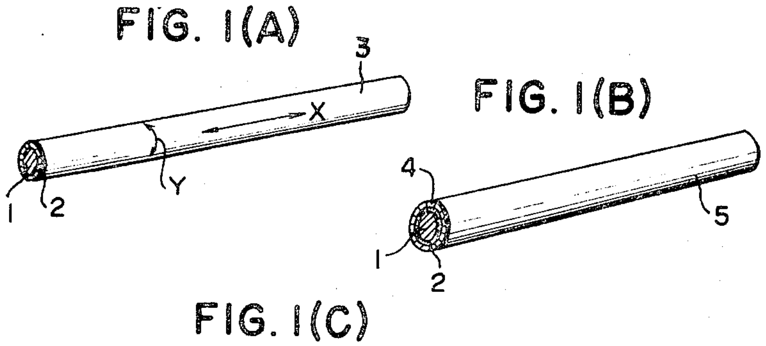

The memory wire 3 as shown in FIG. 1(A) comprises a conductive core wire 1 made of diamagnetic body, such as copper phosphor bronze, or beryllium copper, or paramagnetic body, such as aluminum, on which is coated a ferromagnetic thin film 2, such as permalloy, by means of electric or chemical plating as well as vacuum evaporative deposition.

Employment of elastic material for the core wire 1 is effective to avoid deterioration of characteristic caused by magnetostriction of magnetic substance.

The memory wire 5 as shown in FIG. 1(B) comprises the same core wire 1 and ferromagnetic thin film 2 as those shown in FIG. 1(A), and a thin insulation layer 4 therebetween. In both cases, it is possible with the magnetic thin film 2 to form a closed magnetic circuit in the circumferential direction of the wire 1, because the wire 1 is coated with a magnetic thin film. Since the thin film 2 covers the wire 1 completely, the influence of the external magnetic field will not exert any effect on the wire 1 therein due to its magnetic shielding effect.

The magnetic thin film 2 can be magnetized efficiently by the electric current passing through the wire 1 because the wire 1 is placed very close to the magnetic thin film 2, especially in the case as shown in FIG. 1(A) where the both are held together closely. Output signals produced by a change in magnetic flux caused by changes in the direction or in the intensity of magnetization of the magnetic thin film 2 can be derived efficiently from the wire 1. This is an important characteristic of the wire memory matrix of a magnetic memory apparatus according to this invention.

The direction of easy axis of the magnetic thin film is usually established in the circumferential direction or the longitudinal direction of the wire 1, but can be established in a spiral direction which is a composition of the both. The direction of this easy axis is to be determined depending upon the condition of coating treatment of the magnetic thin film 2.

Figure 1C:
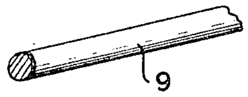

The other memory wire 9, shown in FIG. 1(C), composed entirely of ferromagnetic substance has an advantage in that its mass-production can be easily achieved by merely drawing the ferromagnetic substance, through a die which is a big merit.

Moreover, in accordance with increase of the clock frequency, since the current will concentrate on the surface of the memory wire due to its skin effect, the memory wire 9 will become nearly equivalent to said memory wire 3 or 5. The memory wire 9, in particular, can be drawn up to 0.02 mm. and whose magnetization easy axis can be set either in the axial direction or the circumferential direction, thus making it possible to make it close to the thin film in its property.

In order to avoid a complication of going into detailed illustration and explanation of all the memory wires 3, 5 and 9 separately in the following description, the memory wire 3 will be disclosed principally.

Unless noted specifically, the description thereof can be applied to all the other wires 5 and 9.

Next, a wire memory matrix according to this invention wherein a memory wire (3 or 5 or 9) is used will be disclosed, but particularly in connection with the case of using a memory wire 3.

The principle of a wire memory matrix according to this invention will be explained with reference to FIGS. 2 and 3.

Figure 2A:
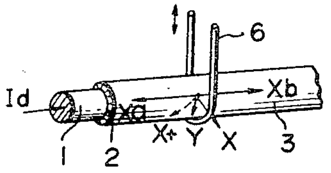

FIG. 2(A) illustrates the case in which the easy axis is in the axial direction of the memory wire 3 and the conductive wire 6 is made to intersect almost orthogonally with the memory wire 3. Both wires 3 and 6 are insulated to each other. In this case, a pulse current I*d* for driving is made to flow through the memory wire 3, and an information current I*i*+ (or I*i*—) is made to flow to the conductor 6. The time relationship between the pulse current I*d* and I*i*+ (or I*i*—) is as shown in FIG. 3. That is, when a pulse current I*d* is impressed on the memory wire 3 first at $t_1$, the current I*d* will flow mostly in the wire 1 because its resistance is smaller than that of the thin film, whereby a magnetic field will be distributed in the circumferential direction of said wire 1. The magnetic thin film 2 will be magnetized in Y direction by this magnetic field. This magnetization in Y direction will be the same regardless of whether the residual magnetism is in X*a* direction or X*b* direction. Next, when an information current I*i*+ (or I*i*—) is impressed on the wire 6 during the duration of the pulse current I*d* at $t_2$, magnetization vector of the magnetic thin film 2 caused by the information current will turn either to direction X*a* or X*b* depending on its polarity. Therefore, a resultant magnetization vector composed of the drive current I*d* and the information current I*i*+ (or I*i*—) will be turned either in direction X+ or X— which is the position between the axial direction and the circumferential direction, depending upon whether the polarity of the information current is (+) or (—). When a drive pulse current I*d* is removed at $t_3$, there will remain only the axial component of said magnetization vector in the direction X+ or the direction X—, whereby said component in return will be written-in and memorized as the residual magnetism of the thin film 2 at $t_4$ when the information signal has been removed. That is, if the polarity (+) or (—) of the information signal is made to correspond, for example, to "1," "0" of the binary information, then the information can be memorized as the direction of the residual magnetism of the magnetic thin film 2 located at the intersection of the wires 3 and 6. When the information thus memorized is to be read out, the drive current I*d* is made to flow to the memory wire 3. Then the magnetization vector will rotate from the axial direction of the memory wire 3 to the circumferential direction thereof, whereby a readout output current corresponding to the differential value of the change in magnetic flux due to said rotation will be read out from the wire 6. As shown in FIG. 3, an output current I*p*+ or I*p*— is read out, the polarity of said current corresponding to the content of the memorized information.

Figure 2B:
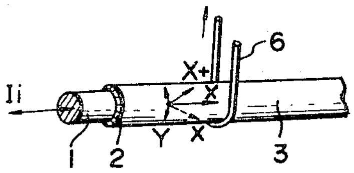
Figure 2C:
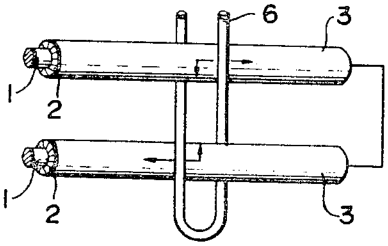
Figure 3:
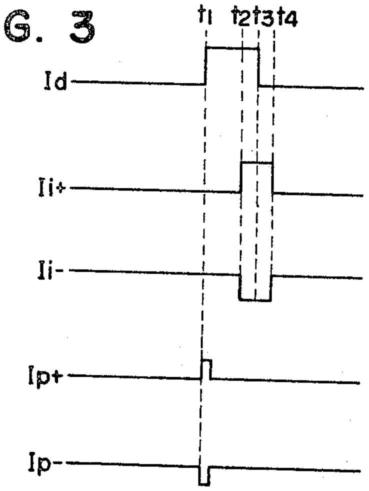

FIG. 2(B) shows the case, wherein the easy axis is in the circumferential direction of the memory wire 3, whereby a driving pulse current I*d* is made to flow to the wire 6, and an information signal current I*i*+ (or I*i*—) is made to flow through the memory wire 3, in the same sequence as that in FIG. 3. As easily analogized from the case of FIG. 2(A), the resultant magnetization vector of both currents I*d* and I*i* is pointed in the direction X+ or X—, and the writing-in is to be made in the direction Y*a* or Y*b* which is the circumferential direction of the memory wire 3. The output current will be read out from the memory wire 3. FIG. 2(C) shows two pieces of memory wire 3 connected in series whereby the output current will become twice as much as that in the case of using one piece of memory wire.

The foregoing explanation is based on a destructive sensing system. However, the memory matrix according to this invention is also applicable to a nondestructive sensing system. The functions of said reading and writing will be explained further in detail hereinafter inclusive of the principle of the nondestructive sensing system.

Figure 4:
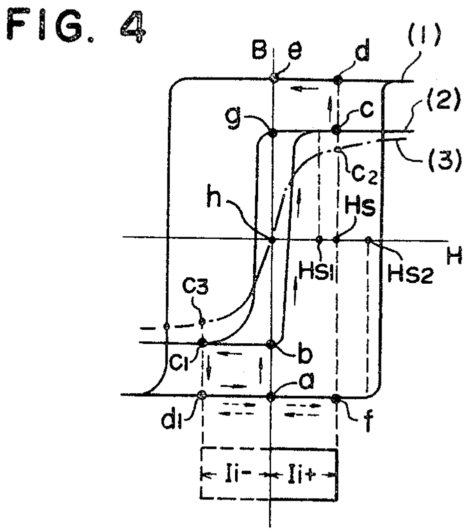

In general, when a switching magnetic field $H_s$ which is in parallel with the direction of the easy axis and a lateral magnetic field $H_t$ which is perpendicular to said $H_s$ are applied simultaneously thereafter varying said lateral magnetic field $H_t$, the magnetization hysteresis characteristic of the magnetic thin film viewed from the direction of the switching magnetic field $H_s$ will vary greatly. That is, as shown in FIG. 4, if the loop characteristic of the thin film 2, when the lateral magnetic field was not impressed, is as shown by the curve 1, the coercive force would decrease gradually with the increase in intensity of the lateral magnetic field $H_t$, thereby converting the loop characteristic to a curve 2 and finally to a curve 3 without having any loop characteristic. As can be understood from the curves 1, 2 and 3, in accordance with increase in the intensity of the lateral magnetic field $H_t$, the intensity of a switching magnetic field required for magnetization reversal will have to be decreased.

The function of said writing and reading will be explained in connection with FIG. 4. Since no pulse current is applied at $t_1$ as shown in FIG. 3, the magnetic thin film 2 disposed at the intersection of the memory wire 3 and the wire 6 is in the state of curve 1. Assuming that an information is memorized in the form of residual magnetism as shown by a point *a*, when the drive pulse current I*d* is made to flow at the time $t_1$, the lateral magnetic field resulting therefrom will be impressed on the magnetic thin film 2, whereby the magnetic hysteresis characteristic will become like the curve 2 and, at the same time, said magnetization will move from the point *a* to the point *b*. As mentioned heretofore, this fact corresponds to rotation of the magnetization vector and a read-out output equivalent to the differential value of the change in magnetic flux caused by said rotation will be induced at the memory wire 3 (or the wire 6), thereby the reading-out of memorized content is carried out. This read output will become larger in proportion to the amount of change of magnetic flux as represented by a section *ab* or to the rise time of the drive pulse current I*d*. When the information pulse signal I*i*+ is applied at the time $t_2$, the magnetization will move from the point *b* to a point *c*, thereby causing inversion in magnetization. At the time $t_3$, the drive pulse current will disappear and only the information pulse signal I*i*+ will remain. Therefore, magnetic hysteresis characteristic will return to the state of curve 1, thereby magnetization will move from the point *c* to a point *d*. A pulse current which is to be generated at this time will be disregarded. Finally, at the time $t_4$ the information pulse signal I+ will disappear also, thus causing the magnetization to reach from the point *d* to a point *e* and then to be settled down. That is, the information pulse signal I*i*+ will be written and memorized in the state of residual magnetism having a polarity corresponding to that of said signal I*i*+. On the other hand, when the information signal I*i*− is applied, contrary to the above case, magnetization will vary through a route $a \rightarrow b \rightarrow c \rightarrow d \rightarrow a$, thus returning to the point *a*. The read output current in this case corresponds to the information which has been memorized at the point *a*, but the polarity as well as magnitude of the residual magnetism will be kept unchanged. The function, when started from the point *e*, can be easily understood from the above description, that is, the route to be taken is either a route $e \rightarrow g \rightarrow c_1 \rightarrow d_1 \rightarrow a$ or a route $e \rightarrow g \rightarrow c \rightarrow d \rightarrow e$ in accordance with the information signal I*i*+ (or I*i*−), whereas the polarity of the output signal will be opposite to the case when started from the point *a*.

The above described function based on the curves 1 and 2 corresponds substantially to a nondestructive sensing, in which it is possible to read-out an output signal corresponding to a memory information when the information signal is not impressed, and furthermore, after reading-out, the memory state will be kept unchanged. However, when a lateral magnetic field due to the drive pulse current I*d* is larger than in the case of curve 2 and when it reaches a point where the magnetic thin film 2 has been saturated in a lateral direction, then the magnetic hysteresis characteristic will coincide with the characteristic in the direction of magnetization difficult axis, while a nondestructive sensing will become impossible, thus falling into a destructive sensing. That is, in the case of starting from the point *a*, the magnetization of the thin film 2, due to the pulse currents as shown in FIG. 3, will change by way of either a route $a \rightarrow h \rightarrow c_2 \rightarrow d \rightarrow e$ or a route $a \rightarrow h \rightarrow c_3 \rightarrow d_1 \rightarrow a$. In the case of starting from the point *e*, the magnetization of the thin film 2 will change by way of either a route $e \rightarrow h \rightarrow c_3 \rightarrow d_1 \rightarrow a$ or a route $e \rightarrow h \rightarrow c_2 \rightarrow d \rightarrow e$. Since magnetization is pointed at the point *h* first when only the driver pulse current I*d* flows, whether the remanence occurs at the point *a* or *e* is to be determined by the polarity of a noise signal which exists in an information current wire (3 or 6) which intersect at right angles with the wire in which the drive current is flowing at that time.

As can be understood from the above explanation, it is possible to make nondestructive sensing when magnitude of the lateral magnetic field is selected so that the noise amplitude existing in the conductor for an information current does not exceed the coercive force of a magnetic hysteresis characteristic which is obtained by impression of the lateral magnetic field. It will become a destructive sensing if a lateral magnetic field being impressed is of such a magnitude that its coercive force becomes lower than noise level.

Next, essential conditions for the magnitude of the drive pulse I*d* and information pulse I*i* will be explained. First, in order that the memory contents of the thin film located at optional intersections are not to be destroyed by disturbance pulses, i.e., many information pulses to be applied to plural cross points composing the same row or same column, amplitude of the information impulse I*i* must be at least within a flat portion and below the curved portion in the curve 1 as shown in FIG. 4. That is, the magnitude of the magnetomotive force $H_s$ due to the information pulse I*i* must be smaller than that of $E_{s2}$ in FIG. 4. On the other hand, if it is less than the saturation point in the curve 2, a perfect writing will not be performed, because a prefect saturation in magnetization would not be obtained. Therefore, it is desirable that the megnetomotive force $H_s$ be larger than $H_{s1}$ as shown in FIG. 4. Hence, the amplitude of an information pulse must satisfy the following equation;

$$H_{s1} \leq H_s \leq H_{s2} \quad (1)$$

In the foregoing description, both the drive current I*d* and the information current I*i* were taken to be direct current pulse signals, but alternating current signal can also be used.

Figure 5:
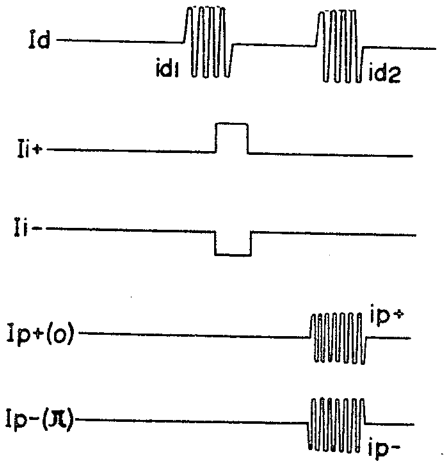

First, in connection with the case in which the drive current I*d* is A.C. and the information currents I*i* is D.C. pulse will be explained. In this case, both currents I*d* and I*i* are impressed on appropriate wire (3 or 6) as shown in FIG. 2(A) or 2(B) according to the direction of the easy axis of the magnetic thin film 2. Examples of a drive signal and an information signal are illustrated in FIG. 5, in which writing-in is performed by an A.C. drive signal $Id_1$ and a D.C. information signal (I*i*+ or I*i*−). In this case, the magnetization characteristic of the thin film 2 will contract from the curve 1 to the curve 2 due to the impression of the A.C. drive signal I*d* and again restore to the curve 1, said action being repeated in the above manner. Thus, when a D.C. information pulse signal I*i* is applied in the state of being magnetized at a point *a*, the magnetization reversal will take place when the coercive force becomes smaller than the amplitude of the information signal during the course in which the magnetization characteristic is changing from the curve 1 to the curve 2, thereafter going through the same process as the case of pulse train as shown in FIG. 3 and will settle down at the point $e$. Writing action in the cases of other state and polarity can easily be analogized from the case of FIG. 3 and therefore detailed explanation thereof will be omitted. Next, in the case of reading-out, an A.C. output signal with a frequency $f$ will be induced in wires (6 or 3) which intersect, at right angles, with the wires (3 or 6) when an A.C. drive signal $Id_2$ with a frequency $f/2$ is applied on the latter wires. This output signal assumes either one of two states having phase difference 180° to each other according to the polarity of the residual megnetism thus written. For example, if the phase is assumed to be "$\theta$" phase when the residual magnetism is (+), then it will be in "$\pi$" phase in case of (−). The charactertistic feature of this method is that the amplitude of the output signal $Ip$ is proportional to the amplitude of information signal $Ii$ so long as the amplitude of the information signal $Ii$ is small, thus making it possible to memorize analogue information signals by utilizing said characteristic. For this purpose, the magnetization characteristic of a magnetic substance should be such as to have a large coercive force and normal hysteresis characteristic rather than a perfect rectangular characteristic.

Figure 6:
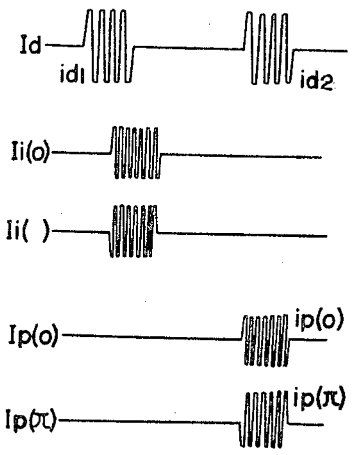

Next, in connection with the case in which the drive current $Id$ and the information signal $Ii$ are both A.C. will be explained. In this case, the drive signal has a frequency $f/2$ as shown in FIG. 6, and the information signal $Ii$ has a frequency $f$ and contains the information in a phase of "0" or "$\pi$." With regard to the impression of signals, the A.C. drive signal $Id$ is impressed in such a manner that a magnetic field is formed along the magnetization difficult axis of the magnetic thin film 2 while the information signal $Ii$ is impressed so that its magnetic field is formed along the easy axis thereof. Therefore, in the case of FIG. 2(B) wherein the easy axis is in longitudinal direction, a drive signal $Id_1$ having a frequency $f/2$ is impressed on the wire 6 and an information signal $Ii(0)$ or $Ii(\pi)$ having a frequency $f$ is impressed on the memory wire 3 in the case of writing-in. Similarly, in the case of reading-out, when a drive signal is applied to the wire 6, an output signal $Ip(0)$ or $Ip(\pi)$ is taken out from the memory wire. In the case of FIG. 2(A), wherein the easy axis is in circumferential direction, a drive signal $Id$ is applied to the memory wire 3 and an information signal $Ii$ is applied to the wire 6 contrary to the said case.

A method of handling an information in a form of A.C. signal phase as shown in FIGS. 5 and 6 is extremely convenient when it is combined with parametron and has a further advantage of making the periphery circuitries of a memory apparatus extremely simple and compact.

Figure 7A:
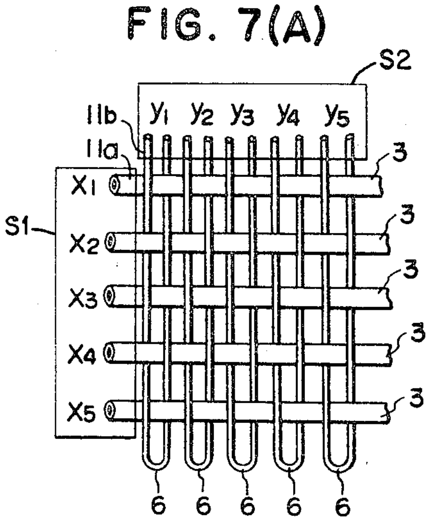
Figure 7B:
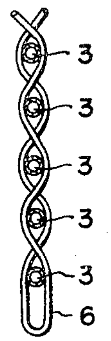

The woven wire memory apparatus based on said operating principle embodying the features of this invention is illustrated by the following examples. FIG. 7 shows the most basic construction of such apparatus comprising a set of row conductive wires $x_1$, $x_2$, $x_3$, . . . juxtaposed to one another and a set of column conductive wires $y_1$, $y_2$, $y_3$ arranged orthogonal to and insulatively to said row conductive wires. Both wires are associated and supported, in a woven state, with one another. FIG. 7(B) is a sectional view thereof. In this case, each of said conductive wires is turned up and one and the other of each pair of said column conductive wires are transposed to each other in at least one medium space between each of all pairs of adjacent row conductive wires as shown in FIG. 7(B). In such a construction, as explained in the foregoing description of principle, a bit of information is stored in the magnetic thin film 2 disposed around the selected intersection point between a row conductive wire and column conductive wire, when selection is achieved by energizing a selected row conductive wire and a selected column conductive wire with the drive current $Id$ from a signal source S1 and the information signal $Ii$ from a signal source S2, respectively. In the case as shown in FIG. 7, for example, the magnetic thin film 2 which is disposed around the intersection points 11*a* and 11*b* between the row conductive wire $x_1$ and the column conductive wire $y_1$ will compose one bit of memory element. As can be understood easily from the foregoing explanation, in a woven wire memory matrix according to this invention, a set of column memory wires and a set of row memory wires are firmly supported with each other simply by waving them in a fabric state, whereby their relative positions are steadily fixed. According to this method, therefore, an easy and economical manufacture is possible through the adaption of textile techniques using conventional weaving machines.

Figure 8A:
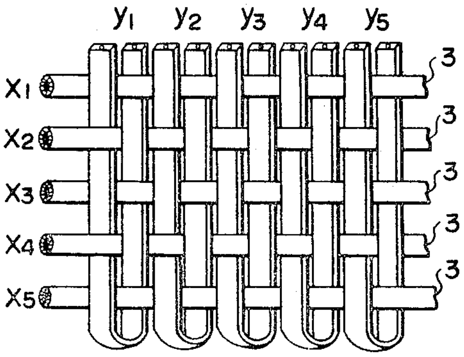
Figure 8B:
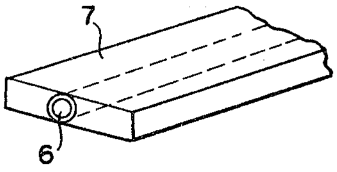
Figure 8C:
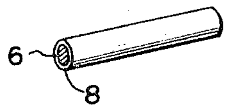

FIG. 8(A) shows the case wherein the outside of the conductive wire 6 is covered with either a belt-shaped insulator 7 as shown in FIG. 8(B) or a cylindrical insulator 8 as shown in FIG. 8(C). Since there is a limit to the bit density on memory wires and furthermore when the adjoining magnetic thin films to be used as a memory element are drawn too closely to each other, portions thereof which make magnetization reversal would contact and moreover overlap one another, it should be avoided to approach the conductive wire 6 within a certain distance to one another. In the case as shown in FIG. 8, even if the row conductive wires 6 are brought so close as to almost contact to each other, it is still possible to maintain a desired separation therebetween by means of an insulator 7 or 8.

Figure 9:
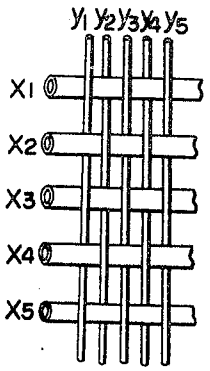

In the case as shown in FIG. 9, the column conductive wire 6 will be a piece of wire which cannot be turned up. In this case, each of the intersection points of the row as well as column conductive wire can be used as memory elements.

Figure 10A:
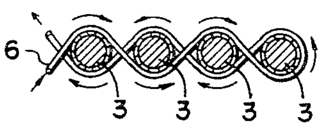
Figure 10B:
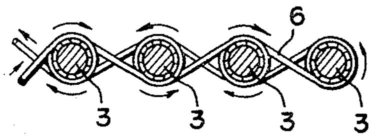
Figure 10C:
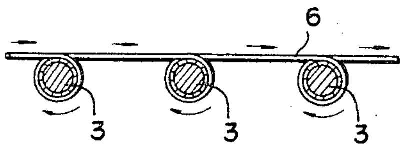
Figure 10D:
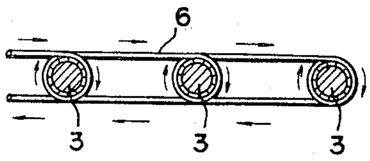

FIGS. 10(A) to 10(D) are sectional views illustrating, in further details, the method of combination of the row conductive wire (memory wire) 3 and the column conductive wire 6. FIG. 10(A), which is substantially same as FIG. 7(B), shows an arrangement, wherein the conductive wire 6 adheres closely to the surface of the memory wire 3. FIG. 10(B) shows the conductive wire 6 which, while winding around each of the memory wires once, at the rate of one number of turn, is transposed in its reciprocating winding. FIG. 10(C) shows the case wherein the conductive wire 6 is wound around each of the memory wires at the rate of one number of turn. FIG. 10(D) shows the conductive wire 6 wound around each of the memory wires in both ways. As the conductive wire 6 is held very closely to the circumference of the memory wire in each case, the writing-in and reading-out can be performed efficiently. In each of said cases, the adhesion between the memory wires 3 and the column wires 6 can be much improved by reducing the diameter of the latter than that of the former.

Next, the actual cases, wherein the inductive coupling between the column wires are made to decrease will be explained with reference to FIGS. 11(A) and 11(B).

Figure 11A:
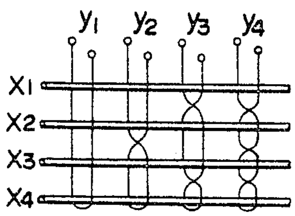
Figure 11B:
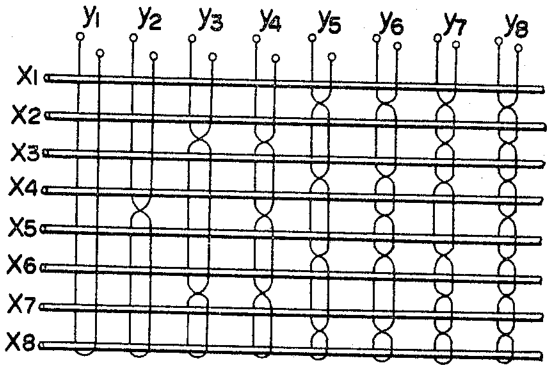

FIG. 11(A) shows a case, wherein the number of row and column wires are four, respectively, whereas FIG. 11(B) shows the case with eight pieces each.

When positive coupling of a row conductive wire and a column conductive wires is indicated by (+1) and negative coupling of the same by (—1), the coupling state in FIG. 11(A) is as shown in the Table 1.

TABLE 1

| | $y_1$ | $y_2$ | $y_3$ | $y_4$ |
|---|---|---|---|---|
| $x_1$ | +1 | +1 | +1 | +1 |
| $x_2$ | +1 | +1 | −1 | −1 |
| $x_3$ | +1 | −1 | −1 | +1 |
| $x_4$ | +1 | −1 | +1 | −1 |

TABLE 2

| | $y_1$ $y_2$ | |
|---|---|---|
| $x_1$ | $(+1)\times(+1)=+1$ | |
| $x_2$ | $(+1)\times(+1)=+1$ | |
| $x_3$ | $(+1)\times(-1)=-1$ | |
| $x_4$ | $(+1)\times(-1)=-1$ | (-) |
| | 0 | |

The coupling between $y_1$ and $y_2$ will be as shown in Table 2 whereby the mutual induction is cancelled. The same is applied to the other case.

It is of course possible to use an optional combination instead of using all the transposing methods so far indicated. For example, it is possible to use an optional combination of the transposing methods or only an optional transposing method as shown in FIG. 11 in the embodiments having been illustrated in FIGS. 7(A), 8(A) and 9.

Figure 12A:
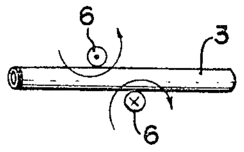
FIG. 12 shows column conductive wire composed of a plurality of conductive wires in the memory matrix embodying the feature of this invention; wherein (A), (B), (C), (D) and (E) are, respectively, a perspective view for describing the principle thereof, a sectional view, a perspective view and plan views.

Next, the case wherein the column conductive wire 6 is composed of a plural number of conductive wires will be explained. In the case of using column conductive wires each composed of said single wire, for example in FIG. 12(A) wherein the going and returning wires which do not face each other exactly in a state of holding the memory wire 3 therebetween, the resultant magnetization vector on the memory wire 3 due to the current flowing through the conductive wire 6 is not in parallel with the axis of the conductive wire 3, thus making it difficult to attain a desired magnetization.

Figure 12B:
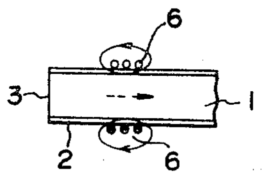
Figure 12C:
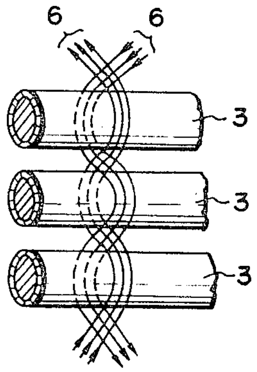

In order to avoid the above-mentioned disadvantages, each of the column conductive wires may be composed of a plural number of conductive wires 6 as shown in FIGS. 12(B) and (C) so that its resultant magnetization vector may be in parallel with the axis of the memory wire 3, thereby a desired magnetization can be attained. Said condition plays an important role in an effective excitation and an effective derivation of output signals.

Figure 12D:
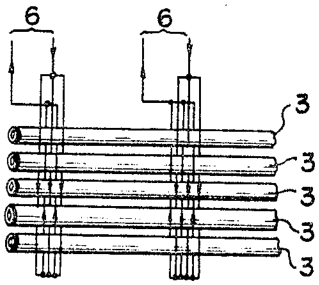
Figure 12E:
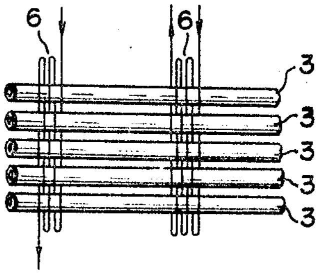

FIG. 12(D) shows the case, wherein the conductive wires are connected in parallel and FIG. 12(E) shows the case, wherein the conductive wires are connected in series. The combination of parallel and series connections can also be used. In either cases, said purpose can be attained.

Next, the method of magnetically isolating the thin film portions of the memory wires 3 and 5 from each other which are to be used as memory elements will be explained. Because of existence of the magnetic thin film 2 covering uniformly the surface of said wires, magnetization reversal occurs not only on the thin films at the specific intersection points, but extends to the thin films disposed at the neighboring intersection points during the writing-in or reading-out process, thereby the memory contents may be destroyed or a smooth and efficient action can be damaged by diamagnetic current due to the fact that the thin films are interconnected. Thus, the memory matrix of this case is composed in such a manner that the coating of magnetic thin film 2 is provided only at specific intersection points which are to be used as memory elements. A first method for producing the memory wire (3*a*) includes a process for coating an insulating layer 10 only at selected parts of conductive wire 1 as shown in FIG. 14 and a process for plating a ferromagnetic thin film 2 thereon. A second method for producing the memory wire (3*b*) includes a process for depositing the magnetic thin film 2 uniformly on the conductive wire 1 by means of vacuum evaporation or electroplating as shown in FIG. 15, and a process for exfoliating unnecessary portions of said thin film 2 by utilizing the technique of photoetching or the like, thus composing the memory wire 3*b*.

Figure 14C:
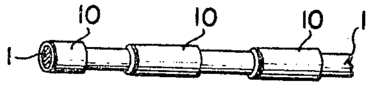
Figure 14D:
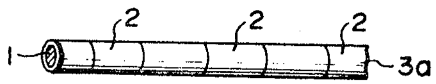
Figure 15B:
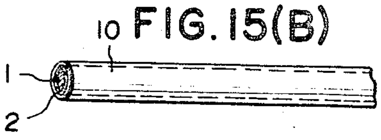
Figure 15C:
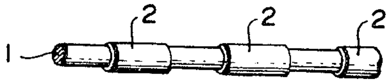
Figure 16B:
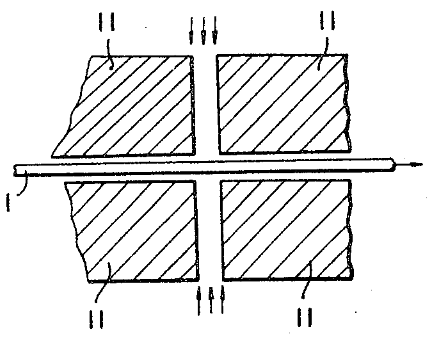
Figure 16C:
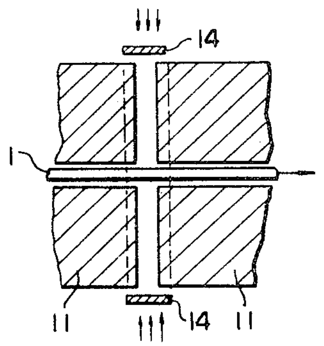

Referring to FIG. 14, a conductive wire partially provided with insulating layer 10 as shown in FIG. 14(C) can be obtained by applying a sensitive material on the conductive wire 1 after the insulating layer 10 has been deposited thereon, thereafter exposing said sensitive material to light partially and then exfoliating the sensitized portions of said sensitive material. Since the sensitive materials are usually insulating substance, in said case the sensitive material can be applied directly on the conductive wire 1 instead of previously depositing an insulating layer 10. FIG. 16(A) shows an example of this method in sectional view of said photoetching method, in which an opaque substance 11 and a transparent substance 12 are arranged alternately, each being provided with a hole at the center thereof through which the conductive wires 1 provided with a sensitive material to be photoetched are passed and then a light is projected on said wires in the direction of arrows, thus sensitizing said wires partially. FIG. 16(B) is the case wherein the conductive wire 1 in the middle is moved stepwise and flickering light is projected on said wire 1, thus sensitizing partial portions. FIG. 16(C), being almost similar in composition to that of 16(B), shows a shutter 14 which is stepwise moved so as to make the wire 1 to be exposed to a light intermittently. In addition to said methods, other optional methods may also be used. However, in these methods, a memory matrix should be constructed by combining row conductive wires, such as the memory wire 3*a* or 3*b* having a magnetic thin film 2 which is partially deposited thereon, with column conductive wires so that the intersecting points of said wires are located at said partially coated magnetic thin film, as illustrated in FIG. 13.

Next, another method of removing a mutual interference between said adjacent memory elements will be explained. This method, which is applicable to all the memory wires 3, 5 and 9, employs the short ring means for magnetically shielding the neighboring elements, said means being located on the row conductive wire. One example of said short ring means is illustrated in FIG. 17, wherein a ring 15 made of a nonmagnetic material and having inside diameter almost equal to the outside diameter of the memory wire 3 is put on the memory wire 3 (including 5 and 9, same hereinafter). When said ring 15 is positioned in such a way, the magnetic materials provided on both sides of said ring 15 will be magnetically isolated from each other, so that a change in magnetization of one of them will not exert any direct effect on the magnetization of the other magnetic material. Therefore, when the arrangement is made so that the short ring means are put on each interval between the neighboring magnetic materials disposed at the intersection points of the memory wire 3 and the column conductive wires $y_1, y_2, \ldots$, as shown in FIG. 18, the memory elements formed at each intersection portions will be magnetically isolated from each other, whereby it becomes possible to shorten the distances between the column conductive wires, to write in and read out information without being damaged by the mutual interference, and to increase bit density.

FIG. 19 is a schematic view showing an actual memory matrix arrangement provided with short ring means, wherein said short ring means can naturally take some other forms. That is, for example, conductive layers 16 may be arranged so that a closed circuit will be formed in the circumferential direction of the memory wire 3, in the same way as in the case of arrangement of the ring 15. The process of forming said conductive layer 16 can be much simplified by adopting the photoetching technique.

Figure 20A:
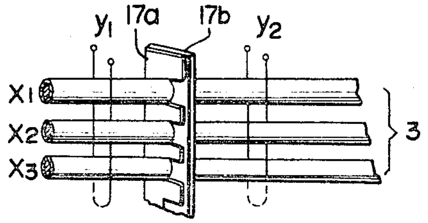
Figure 20B:
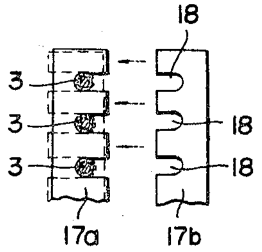

FIGS. 20(A) and (B) show an example of short ring means, wherein two sheets of rectangular conductive plates 17*a* and 17*b* are used, each of said plates being provided on one side thereof with a plurality of notches 18 having capacity for inserting memory wires therein. The conductive plates 17*a*, 17*b* can be associated as shown in FIGS. 20(B) and 20(A) so as to hold the respective memory wires 3 in their notched portions, thus obtaining the same effect of short rings.

Figure 21A:
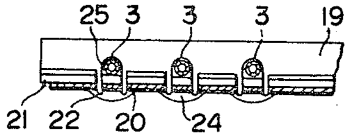
Figure 21B:
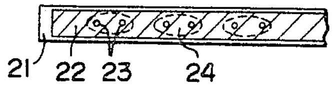
Figure 22B:
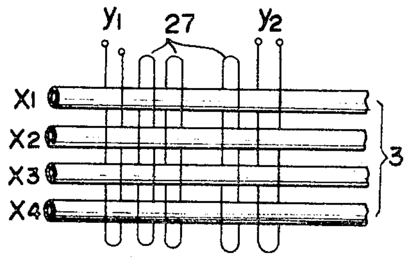

FIG. 21 shows another short ring means, one of which is a rectangular conductor 19, whose side view being shown in FIG. 21(A) and one side thereof is provided with a plurality of notches 25 for holding memory wires, both sides of each of said notches having a pair of projections. The other conductor, as shown in FIG. 21(B), is provided with a conductor 22, by means of the printing technique, on an insulating base plate 21, said conductor 22 being provided with a plurality of a pair of holes 23 which are to be coupled with said projections. When the both conductors 19 and 22 are connected and secured by means of solder 24 after the memory wire has been inserted into the notched portions 25, the effect thereof will be same as said short ring means.

Figure 22A:
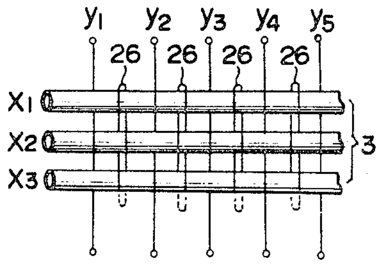

FIGS. 22(A) and (B) show the other embodiment of the short ring means, wherein both ends of each of the conductors 26, which are woven in the same way as the column conductive wires, are connected to make a loop. The number of said conductors may be one (26) or plural (27) as shown in FIGS. 22(A) and (B).

FIG. 23 shows still another example of the short ring means wherein each pair of slender conductors 28*a*, 28*b* are arranged so as to oppose to each other and also to surround a memory wire 3 at the intersection.

FIGS. 24(A), (B) show an example of the actual construction utilizing said slender conductors, wherein two sheets of the substrata 31, each consisting of slender conductors 29 and an insulating member 30 supporting said conductors 29, are combined as one set as shown in FIG. 24(A), thereby the object has been attained. According to the embodiment of FIG. 24(A), the insulating member 30 can be used as the casing for a memory matrix.

As will be understood from the actual examples of this invention, as a means of supporting the entire apparatus, the insulating member 30 as shown in FIG. 24(A), insulating member 21 as shown in FIG. 21, or the insulating plate 32 supporting an output terminal as shown in FIG. 25 may be used. Still another method of holding a memory matrix between two insulating plates 32 may be used as shown in FIG. 25. In order to facilitate designing of terminals, and furthermore, to increase the bit density, the terminals can be taken out in such a manner that, in the case of column conductive wire being composed of a reciprocating wire, terminals of adjacent wires are led out in opposite directions and the terminals on one side of the device are taken out at every other pair.

The woven wire matrix according to this invention has the following advantages.

The first advantage consists in that its operating speed is very fast. The memory wire 3 is especially high operating speed because thin film 2 can be provided at a thickness of 1 micron without any deterioration of characteristics. For example, when a drive pulse signal having a rise time of 20 nanoseconds is used in the case of writing-in with a pulse signal as shown in FIG. 3, the time required for memorizing one bit of the information was approximately 30 nanoseconds. Also, it is possible to obtain a large output current, because the magnetic substance intersecting the memory element and the output conductive wire are held together closely, as mentioned above, or else, the output current can be taken out from the memory element itself. Regarding noises, since the row conductive wire intersects, at right angles, the column conductive wire, the leakage noise component due to mutual induction is little, and the signal-to-noise ratio over 30 db can be obtained. The bit density obtained was less than 1 x 1 mm.$^2$ bit which makes it possible to obtain an extremely small memory matrix than conventional ones. Furthermore, the memory wire 3 can be produced at a speed of 60 m./hour, and the memory wire 9 can be manufactured at a higher speed than the above. As a result, the apparatus of this invention can bring about extremely remarkable industrial effects.

Since it is obvious that many changes and modification can be made in the above described details without departing from the nature and spirit of the invention, it is understood that the invention is not to be limited to the details described herein except as set forth in the appended claims.

What we claim is:

1. A magnetic matrix memory apparatus comprising a set of row conductive wires juxtaposed to one another and a set of column conductive wires arranged substantially orthogonal to and insulatively against said row conductive wires, each of said row conductive wires being composed of a conductive wire coated with a ferromagnetic thin film having a substantially rectangular hysteresis characteristic and an inherent anisotropy, the set of said row conductive wires and the set of said column conductive wires being associated, in a woven state, with one another, said ferromagnetic thin film of each row conductive wire forming closed circumferential magnetic circuits with respect to flux caused by current which is passed through the corresponding row conductive wire, means for applying an information signal to at least one conductive wire of one of the sets of said row and column conductive wires, means for applying an exciting signal to at least one conductive wire of the other set of said row and column conductive wires, the inherent anisotropy of the thin film being established in a plane substantially orthogonal to the axis of conductor to be employed for applying the information signal, and said row conductive wires being encompassed, at the spaces between intersection points of said two sets of the conductive wires, with short ring means of loop conductors for magnetically isolating adjacent parts of said ferromagnetic thin film which is disposed only around adjacent intersection points, whereby a bit of information is stored in the ferromagnetic film disposed around at least one selected intersection point between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected conductive wire employed for applying the information signal, as an output signal having either of opposite polarities determined in accordance with the direction of the residual magnetism.

2. A memory apparatus according to claim 1, wherein said loop conductor of short ring means is composed of ring layers deposited on the magnetic thin films of the row conductive wires along the circumference thereof.

3. A memory apparatus according to claim 1, wherein said loop conductor of short ring means is composed of ring conductors each having an inside diameter substantially equal to the outside diameter of said row conductive wires.

4. A memory apparatus according to claim 1, wherein said loop conductor of short ring means is composed of at least one pair of conductive wires which are orthogonal to the row conductive wires and transposed to each other in every medium space between adjacent row conductive wires, both terminals of said pair of the conductive wires being respectively connected so that the wires of each pair of the conductive wires form a closed loop.

5. A memory apparatus according to claim 1, wherein said loop conductor of short ring means is composed of a pair of slender conductors which are orthogonal to said row conductive wires and opposed to each other so that said pair of conductive wires encompass oppositely each of the row conductive wires at every intersection point therebetween, thus forming a closed loop.

6. A memory apparatus according to claim 1, wherein the slender conductors of each pair are respectively held by different substrate after insertion of an insulation therebetween.

7. A memory apparatus according to claim 1, wherein said loop conductor of short ring means is composed of a pair of rectangular conductive plates arranged orthogonally to said row conductive wires and each having, in its one side, a plurality of notches which are provided at regular intervals and have capacity for inserting each of said row conductive wires, said pair of rectangular conductive plates being made to encompass each of the row conductive wires at every intersection point therebetween so as to insert said row conductive wires in said notches.

8. A memory apparatus according to claim 1, wherein said loop conductor of short ring means is composed of a slender conductor printed on a substratum and a rectangular conductive plate having, in its one side, a plurality of notches which are provided at regular intervals and have capacity for inserting each of said row conductive wires, a pair of projections being provided at both sides of each of said notches, said slender conductor and said rectangular conductive plate being arranged orthogonally to the row conductive wires and coupled to each other after insertion of said row conductive wires so that each pair of said projections is inserted in a pair of holes provided in said printed conductor.

9. A magnetic matrix memory apparatus comprising a set of row conductive wires juxtaposed to one another and a set of column conductive wires each of which is composed of a wire loop insulated against and arranged substantially orthogonal to said row conductive wires, each of said row conductive wires being composed of a conductive wire coated with a ferromagnetic thin film having a substantially rectangular hysteresis characteristic and an inherent anisotrophy, and the set of said row conductive wires and the set of said column conductive wires being associated with one another in a woven state wherein opposite legs of said loop of each of said column conductive wires are transposed with respect to said respective row conductive wires at at least one median space between adjacent row conductive wires thereby being respectively transposed in the same transposition system, said ferromagnetic thin film of each row conductive wire forming closed circumferential magnetic circuits with respect to flux caused by current which is passed through the corresponding row conductive wire, means for applying an information signal to at least one conductive wire of one of said sets of row and column conductive wires, means for applying an exciting signal to at least one conductive wire of the other set of said row and column conductive wires, and the inherent anisotropy of the thin film being established in a plane substantially orthogonal to the axis of conductive wire to be employed for applying the information signal, whereby a bit of information is stored in the ferromagnetic film disposed around at least two selected intersection points between said two sets of the conductive wires in the state of the direction of the residual magnetism of said magnetic thin film when selection is effected by energizing, with the information signal and the exciting signal, at least one selected row two selected intersection points between said two sets of tive wire, and a bit of information stored is read out, from at least one selected conductive wire employed for applying the information signal, as an output signal having either of opposite polarities determined in accordance with the direction of the residual magnetism.

10. A memory apparatus according to claim 9, in which each of said row conductive wires is composed of a conductive wire uniformly and directly plated with a ferromagnetic thin film.

11. A magnetic matrix memory apparatus comprising a set of row conductive wires juxtaposed to one another and a set of column conductive wires arranged substantially orthogonal to and insulatively against said row conductive wires, each of said row conductive wires being composed of a conductive wire uniformly and directly coated with a ferromagnetic thin film having a substantially rectangular hysteresis characteristic and an inherent anisotropy, and the set of said row conductive wires and the set of said column conductive wires being associated in a woven state with one another, said ferromagnetic thin film of each row conductive wire forming closed magnetic circuits with respect to flux caused by current which is passed through the corresponding row conductive wire, the inherent anisotropy of thin film being established in the circumference direction of each of row conductive wires, means for applying an information signal to at least one conductive wire of said set of row conductive wires, and means for applying an exciting signal to at least one conductive wire of said set of column conductive wires, conductive means for magnetically isolating adjacent intersection points between said two sets of conductive wires, whereby a bit of information is stored in the ferromagnetic film disposed around at least one selected intersection point between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected row conductive wire, as an output signal having either of opposite polarities determined in accordance with the direction of the residual magnetism.

12. A magnetic matrix memory apparatus comprising a set of row conductive wires juxtaposed to one another and a set of column conductive wires each of which is composed of a pair of wires arranged substantially orthoganal to and insulatively against said row conductive wires, each of said row conductive wires being composed of a conductive wire coated with a ferromagnetic thin film having a substantially rectangular hysteresis characteristic and an inherent anisotrophy, and the set of said row conductive wires and the set of said column conductive wires being associated with one another in a woven state wherein one and the other of each pair of said column conductive wires are transposed with respect to each other at least one median space between adjacent row conductive wires, said ferromagnetic thin film of each row conductive wire forming closed magnetic circuits with respect to flux caused by current which is passed through the corresponding row conductive wire, means for applying an information signal to at least one conductive wire of either of the sets of said row and column conductive wires, means for applying an exciting signal to at least one conductive wire of the other of said sets of said row and column conductive wires, the inherent anisotropy of the thin film being established in a plane substantially orthogonal to the axis of conductive wire to be employed for applying the information signal, whereby a bit of information is stored in the ferromagnetic film disposed around at least two selected intersection points between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one conductive wire employed for applying the information signal, as an output signal having either of opposite polarities determined in accordance with the direction of the residual magnetism.

13. A memory apparatus according to claim 12, in which each of said row conductive wires is composed of a conductive wire electrically plated with a ferromagnetic thin film.

14. A memory apparatus according to claim 12, in which an easy axis of the magnetic thin film is established in the circumference direction of said row conductive wire so that the information signal and the output signal are applied to and derived from at least one selected row conductive wire.

15. A magnetic matrix memory apparatus comprising a set of row conductive wires juxtaposed to one another and a set of column conductive wires each of which is composed of a wire loop insulated against and arranged substantially orthogonal to said row conductive wires, each of said row conductive wires being composed of a conductive wire coated with a ferromagnetic thin film having a substantially rectangular hysteresis characteristic and an inherent anisotropy, and the set of said row conductive wires and the set of said column conductive wires being associated with one another in a woven state wherein opposite legs of said loop of each of said column conductive wires are transposed with respect to said respective row conductive wires at at least one median space between adjacent row conductive wires thereby being respectively in different transposition systems, said ferromagnetic thin film of each row conductive wire forming closed circumferential magnetic circuits with respect to flux caused by current which is passed through the corresponding row conductive wire, means for applying an information signal to at least one conductive wire of one of the sets of said row and column conductive wires, means for applying an exciting signal to at least one conductive wire of the other set of said row and column conductive wires, the inherent anisotropy of the thin film being established in a plane substantially orthogonal to the axis of conductive wire to be employed for applying the information signal, whereby a bit of information is stored in the ferromagnetic film disposed around at least two selected intersection points between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected conductive wire employed for applying the information signal, as an output signal having either of opposite polarities determined in accordance with the direction of the residual magnetism.

16. A memory apparatus according to claim 15, in which each of said row conductive wires is composed of a conductive wire uniformly and directly plated with a ferromagnetic thin film.

17. A magnetic matrix memory apparatus comprising a set of row conductive wires juxtaposed to one another and a set of column conductive wires each of which is composed of a plurality of wires connected in parallel insulated against and arranged substantially orthogonal to said row conductive wires, each of said row conductive wires being composed of a conductive wire coated with a ferromagnetic thin film having a substantially rectangular hysteresis characteristic and an inherent anistropy, and the set of said row conductive wire and the set of said column conductive wires being associated with one another in a woven state wherein said pluarl wires of each of the column conductive wires are arranged in the same woven state with respect to one another, said ferromagnetic thin film of each row conductive wire forming closed circumferential magnetic circuits with respect to flux caused by current which is passed through the corresponding row conductive wire, means for applying an information signal to at least one conductive wire of one of the sets of said row and column conductive wires, means for applying an exciting signal to at least one conductive wire of the other set of said row and column conductive wires, and the inherent anisotropy of the thin film being established in a plane substantially orthogonal to the axis of conductive wire to be employed for applying the information signal, whereby a bit of information is stored in the ferromagnetic thin film disposed around at least one selected intersection points between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected conductive wire employed for applying the information signal, as output signal having either of opposite polarities determined in accordance with the direction of the residual magnetism.

18. A magnetic matrix memory apparatus comprising a set of row conductive wires juxtaposed to one another and a set of column conductive wires arranged substantially orthogonal to and insulatively against said row conductive wires, each of said row conductive wires being composed of a conductive wire coated with a ferromagnetic thin film, having a substantially rectangular hysteresis characteristic and an inherent anisotropy, at only the intersection points between said two sets of conductive wires, the sets of said row conductive wires and the set of said column conductive wires being associated, in a woven state, with one another, said ferromagnetic thin film of each row conductive wire forming closed circumferential magnetic circuits with respect to flux caused by current which is passed through the corresponding row conductive wire, means for applying an information signal to at least one conductive wire of one of the sets of said row and column conductive wires, means for applying an exciting signal to at least one conductive wire of the other set of said row and column conductive wires, and the inherent anisotropy of the thin film being established in a plane substantially orthogonal to the axis of conductor to be employed for applying the information signal, whereby a bit of information is stored in the ferromagnetic thin film disposed around at least one selected intersection point between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected conductive wire employed for applying the information signal, as an output signal having either of opposite polarities determined in accordance with the direction of the residual magnetism.

19. A magnetic matrix memory apparatus comprising a set of row conductive wires juxtaposed to one another and a set of column conductive wires arranged substantially orthogonal to and insulatively against said row conductive wires, each of said row conductive wires being composed of an electrically conductive wire coated directly with a ferromagnetic thin film having a substantially rectangular hysteresis characteristic and and inherent anisotropy, the set of said row conductive wires and the set of said column conductive wires being associated in a woven state with another, said ferromagnetic thin film of each row conductive wire forming closed circumferential magnetic circuits with respect to flux caused by current which is passed through the corresponding row conductive wire, means for applying direct current information signal to at least one conductive wire of said sets of said row and column conductive wires, means for applying an alternating current exciting signal to at least one conductive wire of the other of said sets of said row and column conductive wires, the inherent anisotropy of the thin film being established in a plane substantially orthogonal to the axis of the conductor employed for applying the information signal, whereby a bit of information is stored in the ferromagnetic film disposed around at least one selected intersection point between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected conductive wire employed for applying the information signal, as an output signal having twice the frequency of that of an alternating signal for reading out and either of two-phase positions, differing by 180° from each other, determined in accordance with the direction of the residual magnetism.

20. A magnetic matrix memory apparatus comprising a set of row conductive wires juxtaposed to one another and a set of column conductive wires arranged substantially orthogonal to and insulatively against said row conductive wires, each of said row conductive wires being composed of an electrically conductive wire coated directly with a ferromagnetic thin film having a substantially rectangular hysteresis characteristic and an inherent anisotropy, the set of said row conductive wires and the set of said column conductive wires being associated in a woven state with one another, said ferromagnetic thin film of each row conductive wire forming closed circumferential magnetic circuits with respect to flux caused by current which is passed through the corresponding row conductive wire, means for applying an alternating current information signal having a frequency $f/2$ to at least one conductive wire of said sets of said row and column conductive wires, means for applying an alternating current exciting signal having a frequency $f$ to at least one conductive wire of the other of said sets of said row and column conductive wires, the inherent anisotropy of the thin film being established in the plane substantially orthogonal to the axis of the conductor employed for applying the information signal, whereby a bit of information is stored in the ferromagnetic film disposed around at least one selected intersection point between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected conductive wire employed for applying the information signal, as an output alternating signal having either of two phase positions, differing by 180° from each other determined in accordance with the direction of the residual magnetism.

21. A magnetic matrix memory apparatus comprising a set of row conductive wires juxtaposed to one another and a set of column conductive wires each of which is composed of a plurality of wires connected in series insulated against and arranged substantially orthogonal to said row conductive wires, each of said row conductive wires being composed of a conductive wire directly and uniformly coated with a ferromagnetic thin film having a substantially rectangular hysteresis characteristic and an inherent anisotropy in a circumferential direction, and the set of said row conductive wires and the set of said column conductive wires being associated with one another in a woven state wherein two adjacent wires of said plurality of wires of the column conductive wires are transposed with respect to said respective row conductive wires at at least one median space between adjacent row conductive wires respectively in the same transposition system, said ferromagnetic thin film of each row conductive wire forming closed circumferential magnetic circuits with respect to flux caused by current which is passed through the corresponding row conductive wire, means for applying an information signal to at least one conductive wire of the set of said row conductive wires, means for applying an exciting signal to at least one conductive wire of the set of said column conductive wires, the inherent anisotropy of the thin film being established in the plane substantially orthogonal to the axis of each row conductive wire, whereby a bit of information is stored in the ferromagnetic thin film disposed around at least one selected intersection point between said two sets of the conductive wires in the state of the direction of the residual magnetism of said magnetic thin film when selection is effected by energizing, with the information signal and the exciting signal, at least one selected row conductive wire and at least one selected column conductive wire, and a bit of information stored is read out, from at least one selected row conductive wire, as an output signal having either of opposite polarities determined in accordance with the direction of the residual magnetism.

References Cited

UNITED STATES PATENTS

| | | | |
|---|---|---|---|
| 2,985,948 | 5/1961 | Peters | 29—155.5 |
| 3,068,554 | 12/1962 | Pouget | 29—155.5 |
| 2,910,673 | 10/1959 | Bloch | 340—174 |
| 2,934,748 | 4/1960 | Steimen | 340—174 |
| 3,069,661 | 12/1962 | Gianola | 340—174 |
| 3,069,665 | 12/1962 | Bobeck | 340—174 |
| 3,083,353 | 3/1963 | Bobeck | 340—174 |
| 3,134,965 | 5/1964 | Meier | 340—174 |

OTHER REFERENCES

New Twist in Memory Devices in Journal of Applied Physics, February 1958, p. VII.

McCabe, P. N.: Twistor Memories in Instruments and Control Systems, vol. 23, July 1961, pp. 1242–1245.

JAMES W. MOFFITT, *Primary Examiner.*

U.S. Cl. X.R.

29—604